(12) United States Patent
Mandel (10) Patent No.: US 11,196,987 B2
(45) Date of Patent: Dec. 7, 2021

(54) SYSTEMS AND METHODS FOR VERIFYING QUALITY OF DISPLAYED DIGITAL CONTENT

(71) Applicant: NBCUniversal Media, LLC, New York, NY (US)

(72) Inventor: William Richard Mandel, Moorpark, CA (US)

(73) Assignee: NBCUniversal Media, LLC., New York, NY (US)

( * ) Notice: Subject to any disclaimer, the term of this patent is extended or adjusted under 35 U.S.C. 154(b) by 101 days.

(21) Appl. No.: 14/936,300

(22) Filed: Nov. 9, 2015

(65) Prior Publication Data

US 2017/0134723 A1 May 11, 2017

(51) Int. Cl.
| | | |
|---|---|---|
| *H04N 17/00* | (2006.01) | |
| *G09G 5/04* | (2006.01) | |
| *G09G 3/00* | (2006.01) | |
| *G09G 5/10* | (2006.01) | |
| *G09G 5/06* | (2006.01) | |
| *G09G 3/20* | (2006.01) | |

(52) U.S. Cl.
CPC ............ *H04N 17/004* (2013.01); *G09G 3/006* (2013.01); *G09G 3/2003* (2013.01); *G09G 5/04* (2013.01); *G09G 5/06* (2013.01); *G09G 5/10* (2013.01); *G09G 2320/0233* (2013.01); *G09G 2320/0242* (2013.01); *G09G 2320/0666* (2013.01); *G09G 2320/0693* (2013.01); *G09G 2330/12* (2013.01); *G09G 2340/06* (2013.01); *G09G 2340/14* (2013.01); *G09G 2360/145* (2013.01)

(58) Field of Classification Search
CPC .................................................. H04N 17/004
USPC ........................................................ 348/189
See application file for complete search history.

(56) References Cited

U.S. PATENT DOCUMENTS

| | | | | |
|---|---|---|---|---|
| 3,456,068 A | * | 7/1969 | Wilhelmy | ............... H04N 17/04 348/179 |
| 2004/0001185 A1 | * | 1/2004 | Wada | ............... H04N 21/42202 353/31 |
| 2005/0110740 A1 | * | 5/2005 | Linzmeier | ............ G09G 3/3406 345/102 |
| 2013/0069973 A1 | * | 3/2013 | Ichikawa | ................ A61B 3/032 345/593 |
| 2013/0307995 A1 | * | 11/2013 | Nakata | ................. H04N 9/3114 348/189 |
| 2014/0028739 A1 | * | 1/2014 | Takahashi | ............ G09G 3/2003 345/690 |

(Continued)

*Primary Examiner* — John W Miller
*Assistant Examiner* — Justin B Sanders
(74) *Attorney, Agent, or Firm* — Fletcher Yoder P.C.

(57) ABSTRACT

In one embodiment, a method is provided. The method includes comparing a first hue of a displayed test pattern with a second hue of a generated test pattern to determine one or more differences in hue. The displayed test pattern is displayed on a display of a media viewing device, and the media viewing device receives and displays digital content. The displayed test pattern includes a first plurality of steps, and a first step of the first plurality of steps includes the first hue. The generated test pattern includes a second plurality of steps, and each step of the second plurality of steps includes the second hue. The one or more differences in hue are utilized to determine a quality of the digital content displayed on the media viewing device.

19 Claims, 3 Drawing Sheets

(56) References Cited

U.S. PATENT DOCUMENTS

| | | | | |
|---|---|---|---|---|
| 2014/0092122 A1* | 4/2014 | Sano | ................... | G09G 5/02 |
| | | | | 345/601 |
| 2015/0319416 A1* | 11/2015 | Nakajima | ............ | H04N 5/4401 |
| | | | | 348/474 |

* cited by examiner

SYSTEMS AND METHODS FOR VERIFYING QUALITY OF DISPLAYED DIGITAL CONTENT

BACKGROUND

The present disclosure relates generally to the field of digital content delivery, and more particularly to systems and methods for verifying the quality of High Dynamic Range (HDR) content displayed on media viewing devices.

Various consumer media viewing devices, such as televisions, computers, and handheld devices (e.g., cellular telephones, audio and video players, gaming systems, and so forth), are configured to display digital content received from one or more content providers. With the advent of HDR (e.g., HDR imagery video), consumers may select HDR content from one or more digital content providers and receive HDR content on their personal media viewing devices. Typical HDR content may include a high level of contrast between light and dark images (e.g., large brightness range). Accordingly, HDR content may include imagery that more closely resembles colors and brightness visualized in real life, thereby providing consumers with a more realistic viewing experience.

However, in certain situations, consumer media viewing devices may not support HDR content. Further, in some situations, consumer media viewing devices that support HDR content may not support the specific brightness range of HDR content received from the digital content providers. Accordingly, conventional media viewing devices may utilize tone mapping techniques, or other image processing techniques, to adapt HDR content provided by the digital content providers for the consumer's media viewing devices and displays. Specifically, tone mapping techniques may be used to adjust the visual dynamic range (e.g., brightness range of each primary color) of the HDR content, such that the HDR content is suitable for the specific brightness and color range of the consumer's media viewing device. However, in certain situations, tone mapping techniques may not exist within the consumer's media viewing device, thereby resulting in distorted imagery (e.g., poor color shifts, distorted colors, distorted brightness, etc.) on the consumer's media viewing devices. Further, in certain situations, existing tone mapping techniques may produce poor results, thereby resulting distorted imagery on the consumer's media viewing devices. Accordingly, it may be beneficial to provide for systems and methods that verify the quality of the HDR content displayed on the consumer's media viewing device. Further, it may be beneficial to provide for systems and methods that take corrective actions if the quality of the HDR content displayed on the consumer's media viewing device is poor.

BRIEF DESCRIPTION

Certain embodiments commensurate in scope with the originally claimed subject matter are summarized below. These embodiments are not intended to limit the scope of the claimed subject matter, but rather these embodiments are intended only to provide a brief summary of possible forms of the subject matter. Indeed, the subject matter may encompass a variety of forms that may be similar to or different from the embodiments set forth below.

In one embodiment, a method is provided. The method includes comparing a first hue of a displayed test pattern with a second hue of a generated test pattern to determine one or more differences in hue. The displayed test pattern is displayed on a display of a media viewing device, and the media viewing device receives and displays digital content. The displayed test pattern includes a first plurality of steps, and a first step of the first plurality of steps includes the first hue. The generated test pattern includes a second plurality of steps, and each step of the second plurality of steps includes the second hue. The one or more differences in hue are utilized to determine a quality of the digital content displayed on the media viewing device.

In one embodiment, a system is provided. The system includes a processor-based device communicatively coupled with a processor-based media viewing device. The processor-based media viewing device receives digital content and displays the digital content on a display of the media viewing device. The processor-based device generates a generated test pattern for output on the display of the media viewing device. The generated test pattern includes a first plurality of steps, and each step of the first plurality of steps includes a first hue. The generated test pattern is displayed on the media viewing device to determine a quality of the digital content displayed on the media viewing device.

In one embodiment, a tangible, non-transitory, computer-readable medium configured to store instructions executable by a processor of a personal computing device is provided. The instructions, when executed, receive a generated test pattern for output on a display of a media viewing device. The media viewing device is receives and displays digital content. The generated test pattern includes a first plurality of steps and each step of the first plurality of steps includes a first hue. The instructions, when executed, display the generated test pattern on the display of the media viewing device. The displayed test pattern includes a second plurality of steps, and a first step of the second plurality of steps includes a second hue. The one or more differences between the first hue and second hue are utilized to determine a quality of the digital content displayed on the media viewing device.

DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," "the," and "said" are intended to mean that there are one or more of the elements. The terms "comprising," "including," and "having" are intended to be inclusive and mean that there may be additional elements other than the listed elements. It should be noted that the term "multimedia" and "media" may be used interchangeably herein.

Embodiments of the present disclosure generally relate to a verification system that tests and evaluates the quality of HDR content displayed on a media viewing device. Specifically, the verification system may include a cloud services system that is communicatively coupled to a testing/analysis system and a test pattern generation system. Further, in certain embodiments, the verification system includes one or more media viewing devices communicatively coupled to a personal device (e.g., handheld device, computer, smart phone, tablet, a camera, etc.) and/or a chromaticity sensor. The media viewing device may be adapted for playing video, audio, or multi-media content. For example, the media viewing device may be a conventional television set or a HDR television set associated with a processing system, such as a cable, satellite, or set-top box. In certain embodiments, the media viewing device may support HDR content and/or may include tone mapping software to adapt HDR content for display on the media viewing device. In other embodiments, the media viewing device may not support HDR content and/or may not include tone mapping software for adapting HDR content for display.

In certain embodiments, the test pattern generation system of the verification system may generate one or more test patterns that may be utilized to evaluate the quality of the HDR content displayed on the media viewing device. The cloud services system may store the one or more generated test patterns, and when accessed, may provide the one or more generated test patterns to the media viewing device for display. The media viewing device may receive and display the one or more generated test patterns. Further, the personal device may be configured to capture an image of the displayed test pattern from the display of the media viewing device. Specifically, the personal device may provide the captured image (e.g., an image of the displayed test pattern) to the testing/analysis system via the cloud services system. In certain embodiments, the testing/analysis system may compare the generated test pattern with the displayed test pattern. As further described in detail below, the testing/analysis system may determine the quality of the HDR content displayed on the media viewing device based on a comparison of the generated test pattern and the displayed test pattern. In certain embodiments, a user may view the displayed test pattern on the media viewing device to evaluate the quality of the HDR content displayed on the media viewing device with a naked eye. Further, in certain embodiments, the chromaticity sensor may capture an image of the displayed test pattern to compare the generated test pattern with the displayed test pattern.

It should be noted that in certain embodiments, the personal device may be configured to generate and store the test patterns. Further, in such embodiments, the media viewing device may access the one or more generated test patterns directly from the personal device for display on the media viewing device. Additionally, in some situations, the personal device may capture an image of the displayed test pattern, and may compare the generated test pattern with the displayed test pattern to evaluate the quality of the HDR content displayed on the media viewing device. Accordingly, the personal device may be configured function as one or more of the test pattern generation system, the testing/analysis system, and/or the cloud services system, as further described in detail below.

In certain embodiments, the test pattern generation system may generate a test pattern with an unbalanced color pair arranged along a brightness ramp. Specifically, the generated test pattern may include one or more steps (e.g., 10, 15, 16, 20, 25, 50, 100, or more), and each step of the generated test pattern may include a gradual increase in brightness along the brightness ramp. Further, the generated test pattern may include an unbalanced color pair having a large ratio (e.g., 1:10, 1:50, 1:100, etc.) of two colors (e.g., red and blue, red and green, blue and green, etc.). Specifically, while the brightness of each step may increase along the brightness ramp, the ratio of the two colors may remain the same for each of the one or more steps along the brightness ramp. In certain embodiments, the test pattern generation system may generate a series of test patterns with 2, 3, 4, 5, 6 7, 8, 9, 10 or more individual test patterns. Each generated test pattern within the series may include the same or a different range of brightness along the brightness ramp. Further, each generated test pattern within the series may include the same or a different unbalanced color pair and/or the same or a different ratio of the colors between the unbalanced color pair. Accordingly, in certain embodiments, the verification system may utilize a single generated test pattern to test and evaluate the media viewing device, while in other embodiments, the verification system may utilize one or more generated test patterns (such a series of test patterns) to test and evaluate the media viewing device.

As noted above, the generated test pattern (or the generated series of test patterns) may be provided and displayed on the media viewing device. In certain embodiments, the personal device may capture an image of the displayed test pattern and may provide the image to the testing/analysis system of the verification system. The testing/analysis system may compare the generated test pattern with the displayed test pattern. Specifically, the testing/analysis system may determine one or more differences between the expected hue for each step of the generated test pattern with the actual (e.g, displayed) hue of each step of the displayed test pattern. In certain embodiments, the testing/analysis system may be configured to determine the one or more differences by comparing the color ratios of the expected hue with the color ratios of the displayed hue. For example, the testing/analysis system may measure and compare the chromaticity of each step of the displayed test pattern with the original chromaticity of each step of the generated test pattern. In this manner, the testing/analysis system may evaluate the quality of HDR content displayed on the media viewing system. For example, for a media viewing device that does not support HDR content and/or does not include any tone mapping features, the displayed test pattern may not exhibit the expected hue for one or more steps. Further, for a media viewing device that supports HDR content but includes inferior tone mapping features, the displayed test pattern may not exhibit the expected hue for one or more steps. Rather, the media viewing device may exhibit a hue having color ratios (e.g., a ratio of red, blue, and/or green) that varies from the color ratio of the generated test pattern, thereby indicating a degree of distortion on the display of the media viewing device.

In certain embodiments, the testing/analysis may determine whether the one or more differences between the generated and displayed test pattern exceed a predetermined threshold. In situations where the predetermined threshold is exceeded, the testing/analysis system may take one or more corrective actions to improve the quality of the HDR content displayed on the media viewing device. Similarly, in situations where the predetermined threshold is not exceeded, the testing/analysis system may recommend maintaining the HDR settings of the media viewing device. Accordingly, in this manner, the verification system may evaluate the quality of the HDR content displayed on the media viewing device, and may take remedial actions if the evaluation fails to provide favorable results. It should be noted that in certain embodiments, a chromaticity sensor may be used to evaluate the differences between the generated and displayed test patterns. Further still, a user may visually evaluate the differences between the generated and displayed test patterns based on a reference test pattern.

Figure 1:
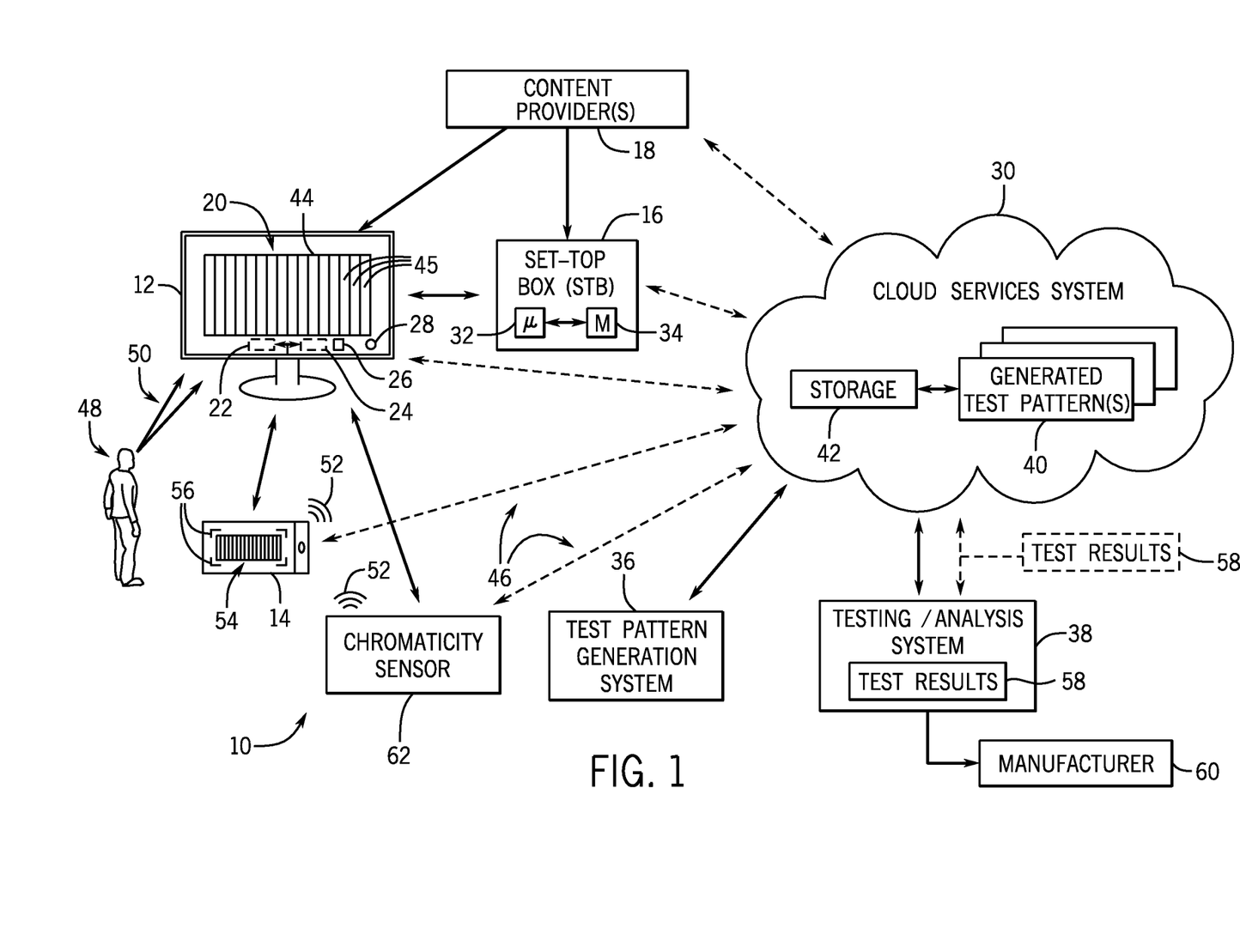
FIG. 1 is a diagrammatical representation of an exemplary digital content verification system that tests and evaluates the quality of HDR content displayed on a media viewing device, in accordance with aspects of the present embodiments.

With the forgoing in mind, FIG. 1 is a diagrammatical representation of an exemplary verification system 10 having a media viewing device 12 communicatively coupled with a personal device 14. The media viewing device 12 may include smart-phones, computers, tablets or hand-held computers, laptops, conventional or High Dynamic Range (HDR) television sets associated with a processing system (e.g., cable, satellite or set-top box 16), conventional or HDR television sets configured or communicatively coupled to the Internet, and/or other personalized computing devices. The media viewing device 12 may be utilized in homes, businesses, automobiles, or other entertainment venues (e.g., theaters, shopping malls, etc.), to receive and display digital content from one or more content providers 18 (e.g., broadcaster and/or video-on-demand provider). In particular, in certain embodiments, the one or more content providers 18 may provide primary content, such as HDR imagery video, audio, or other types of multi-media (e.g., images, animation, etc.) to the media viewing device 12.

The media viewing device 12 may include a display 20, a processor 22, an associated memory 24, various inputs/outputs 26, and components 28 that provide various audio/visual notifications (e.g., speakers, visual indicators, etc.). In particular, the media viewing device 12 may be adapted to receive primary content (e.g., HDR content) in real time or in near real time as the content is distributed by the content providers 18. In certain embodiments, the media viewing device 12 may be communicatively coupled directly to the content providers 18 and a cloud services system 30. In other embodiments, the media viewing device 12 may be communicatively coupled with the set-box top 16, and may receive the primary content via the set-top box 16. In such embodiments, the set-top box 16 may be directly associated with the content providers 18 and/or the cloud services system 30. The set-top box 16 may additionally or alternatively include a processor 32 and an associated memory 34.

In certain embodiments, the primary content (e.g., HDR content) provided to the media viewing device 12 may be directly displayed on the display 20. In other embodiments, the media viewing device 12 may not support HDR content or the media viewing device 12 may not fully support the range of the HDR content provided to the media viewing device. Accordingly, in such embodiments, the media viewing device 12 (or the set-top box 16) may adapt the received HDR content to approximate the appearance of the HDR imagery for the display 20 of the media viewing device 12. For example, the processor 22 (associated with the media viewing device 12) and/or the processor 32 (associated with the set-top box 16) may include processing circuitry configured for tone mapping techniques, or other image processing techniques. Specifically, the processors 22, 32 may adapt the HDR content for display on the media viewing device 12 by approximating the appearance of the HDR content for a medium with a more limited dynamic range. For example, a media viewing device 12 having a liquid-crystal display (LCD) may have a limited dynamic range that may not be adequate for the full range of color and brightness intensities included in typical HDR content. Accordingly, such a media viewing device may utilize various tone mapping functionalities to adapt HDR content received from the content providers 18, such that it may be viewed on the LCD display.

However, in certain situations, the tone mapping functionalities may be inadequate, and the resulting content displayed on the display 20 may be skewed or distorted (e.g., inadequate color shifts, distorted colors, distorted brightness, etc.). For example, in certain situations, inadequate tone mapping may alter certain colors or brightness within the received HDR content, and the displayed HDR content may be of poor quality. Further, in certain situations, the media viewing device 12 and/or the set-top box 16 may not include any tone mapping functionalities, and the displayed HDR content may be of poor quality because the media viewing device 12 does not support HDR content. Accordingly, in certain embodiments, it may be beneficial for the verification system 10 to test and evaluate the quality of HDR content displayed on the media viewing device 12. Further, if the quality of the HDR content displayed is poor, it may be beneficial for the verification system 10 to take remedial or corrective actions, as further described in detail below.

Figure 2:
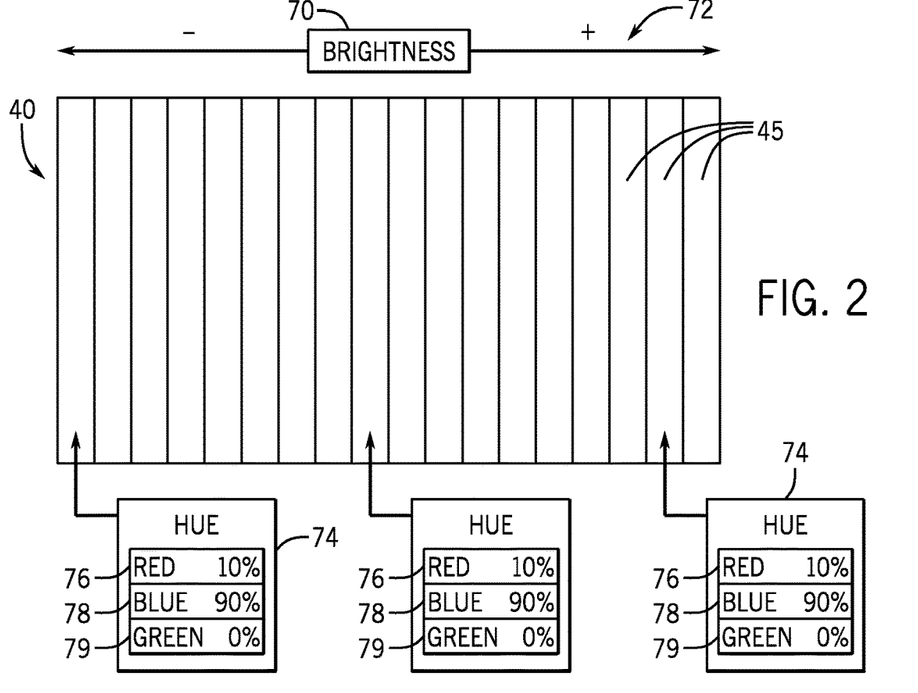
FIG. 2 is a diagrammatical representation of an exemplary test pattern generated for display on the media viewing device, where the generated test pattern includes one or more steps having the same hue, in accordance with aspects of the present embodiments.
Figure 3:
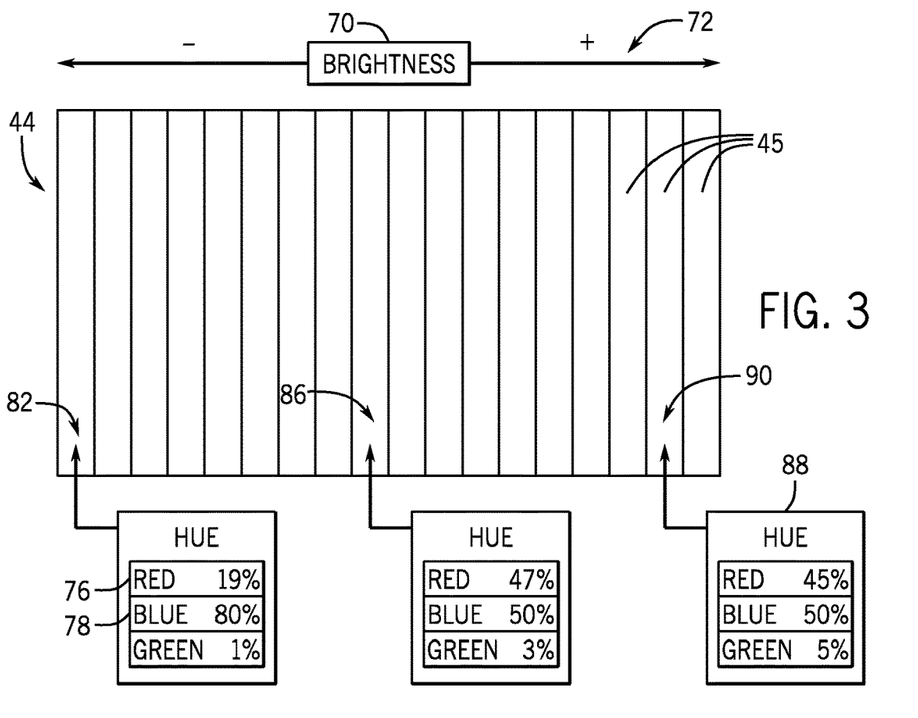
FIG. 3 is a diagrammatical representation of an exemplary test pattern displayed on the media viewing device, where the displayed test pattern includes one or more steps having a hue different from the hue of the generated test pattern, in accordance with aspects of the present embodiments.

In certain embodiments, the cloud services system 30 may be communicatively coupled with a test pattern generation system 36 and a testing/analysis system 38. Specifically, the test pattern generation system 36 may be configured to generate one or more test patterns 40 that may be utilized by the verification system 10 to test and evaluate the quality of the HDR content displayed on the media viewing device 12. In certain embodiments, the test pattern generation system 36 may generate a test pattern 40 by arranging an unbalanced color pair in one or more steps 45 along a brightness ramp, as further described with respect to FIG. 2. For example, each generated test pattern 40 may include one or more steps 45 (e.g., 10, 15, 16, 20, 25, 50, 100, or more), and each step of the generated test pattern 40 may include a gradual increase in brightness along a brightness ramp (as illustrated in FIGS. 2 and 3).

Additionally, in certain embodiments, each step of the generated test pattern 40 may have the same hue. A hue may be a color appearance parameter that may be defined by various degrees of blue, green, red, and in some cases, yellow. In certain embodiments, a hue may be quantified and/or calculated based on its composition (e.g., the amount of red, blue, and/or green), as described with respect to the CIECAM02 standard published by the International Commission on Illumination (CIE). In other words, each hue may be associated with a specific color ratio of red, blue, and/or green. As noted above, each step of the one or steps of the generated test pattern 40 may include the same hue (e.g., same color ratio of red, blue, and/or green). In certain embodiments, the hue for each step of the generated test pattern 40 may include an unbalanced pair of two colors (e.g., red and blue, red and green, blue and green, etc.) having a large ratio (e.g., 1:10, 1:50, 1:100, etc.) of the first color to the second color, as further described with respect to FIG. 2. In certain embodiments, the test pattern generation system 36 may generate a series of test patterns 40 by arranging one or more test patterns having different or similar steps 45, brightness range, and/or unbalanced color pairs, as further described with respect to FIG. 2.

The media viewing system 12, the set-top box 16, the content providers 18, and/or the personal device 14 may be communicatively coupled to the cloud services system 30 via one or more communication channels 46. The communication channels 46 may include various Internet technologies, wired or wireless networks, or various cable or satellite technologies. In particular, in certain embodiments, the communication channels 46 may be utilized by the media viewing device 12 (or a user utilizing the media viewing device 12) to access and retrieve the generated test patterns 40 stored within the cloud services system 30. In certain embodiments, the generated test patterns 40 may be automatically accessed when initially calibrating the media viewing device 12 for receiving HDR content. Further, in certain embodiments, the generated test patterns 40 may be accessed after a user selects an HDR broadcast from the content providers 18. Indeed, the generated test patterns 40 may be accessed and retrieved from the cloud services system 30 at any point where an analysis of the quality of the HDR displayed would be beneficial. Further, in certain embodiments, one or more generated test patterns 40 (e.g., series of test patterns 40) may be accessed and retrieved from the cloud services system 30. In certain embodiments, each generated test pattern 40 of a series of generated test patterns 40 may be provided at predetermined time intervals to the media viewing device 12. In other embodiments, the series may provided to the media viewing device 12 at once instance, and may be individually or collectively displayed on the media viewing device 12.

In certain embodiments, the generated test pattern 40 may be displayed on the display 20 of the media viewing device 12. In certain embodiments, the generated test pattern 40 may be processed similar to how HDR content may be processed and displayed on the media viewing device 12. For example, with media viewing devices 12 and/or set-top boxes 16 that include tone mapping techniques (or other image processing techniques), the generated test pattern 40 may be processed with the same techniques before being displayed on the media viewing device 12. Accordingly, inferior tone mapping techniques may be determined by comparing the generated test pattern with the displayed test pattern. Specifically, in situations where inferior tone mapping techniques are utilized, the hue for one or more steps 45 of the displayed test pattern 44 may not match the hue of the generated test pattern 40, as further described with respect to FIG. 3. Accordingly, the differences between the displayed and generated test patterns may be measured subjectively (e.g., changes in the color may be visually observed) or may be measured objectively (e.g., via the personal device 12 and/or a chromaticity sensor 62), as further described below. Further still, in certain embodiments, the displayed test patterns 44 may be compared against one or more quality tolerances to determine the quality of the HDR content displayed on the media viewing devices 12.

In certain embodiments, the differences between the generated and displayed test pattern may be measured subjectively when a user 48 visually observes (e.g., reference number 50) the displayed test pattern 44. In certain embodiments, the user 48 may visually inspect the displayed test pattern 44 to determine color shifts within the one or more steps 45 of the displayed test pattern 44. In certain embodiments, the user 48 may have one or more reference test patterns (either in a physical form or received through an alternative device, such as the personal device 14), and may visually compare the displayed test pattern 44 with the reference test patterns for differences. Specifically, the user 48 may observe the displayed test pattern 44 to subjectively determine one or more differences in hue between one or more steps 45 of the displayed test pattern 44 and the one or more steps 45 of the generated test pattern 40. In this manner, the user 48 may subjectively evaluate the quality of the HDR content displayed on the media viewing device 12.

In certain embodiments, the differences between the generated and displayed test pattern may be measured objectively with the personal device 14. As noted above, the personal device 14 may be a handheld device, a computer, a smart phone, a tablet, or any other personal computing device with processing power and communication capabilities. In certain embodiments, the personal device 14 may utilize wired or wireless communication capabilities 52 (e.g., Wi-Fi, Bluetooth, near field communication (NFC), etc.) to communicate with the media viewing device 12 and/or the set-top box 16. Specifically, the personal device 14 may include a display 54 and a camera that may be utilized to capture an image of the displayed test pattern 44 from the media viewing device 12. In certain embodiments, one or more markers 56 on the display 54 of the personal device 14 may be utilized to capture a full image of the displayed test pattern 44, including each of the one or more steps 45. The captured image may be transmitted to the testing/analysis system 38 via the cloud services system 30 for objective analysis.

As noted above, the testing/analysis system 38 (or in some embodiments, the personal device 14) may compare the generated test pattern 40 with the image of the displayed test pattern 44. Specifically, the testing/analysis system 38 may measure and compare the chromaticity of each step of the displayed test pattern 44 with the chromaticity of the generated test pattern 40, as further described with respect to FIG. 3. For example, the hue may be measured for each step 45 of the displayed test pattern 44. Specifically, the hue composition (e.g., amount of red, blue, green) may be quantified for each step 45 of the displayed test pattern 44. Further, the hue determined for each step 45 may be compared against the hue utilized to create the generated test pattern 40. As noted above, each step of the generated test pattern 40 may be formed with the same hue (e.g., the same unbalanced color ratio of the first color to the second color), as further described with respect to FIG. 2. Accordingly, differences between the displayed and generated test patterns 40, 44 may be measured. In particular, deviations outside of a predetermined range or threshold may be utilized to determine the quality of the HDR content displayed on the media viewing device 12, as further described with respect to FIG. 3.

In certain embodiments, the differences between the generated and displayed test pattern may be measured objectively with the chromaticity sensor 62. Specifically, in certain embodiments, the chromaticity sensor 62 may be utilized to measure the hue composition (e.g., amount of blue, red, green) for each step 45 within the displayed test pattern 44. Indeed, the chromaticity sensor 62 may be utilized to directly measure the chromaticity of one or more steps from the display 20 of the media viewing device 20. Further, in certain embodiments, the chromaticity sensor may communicate the measurements of the displayed test pattern 44 to the testing/analysis system 38 via the one or more communication channels 46 or may utilize the wired or wireless network 52 (e.g., Bluetooth, Wi-Fi, NFC, etc.) to communicate with a device that is coupled to the cloud services system 30.

In certain embodiments, test results 58 of the test pattern analysis may be provided to one or more parties for corrective actions (if necessary) and/or recommendations related to maintaining the current HDR settings (if corrective actions are not necessary). For example, the test results 58 may be provided via the cloud services system 30 and the communication channels 46 to the media viewing device 12, the set-top box 16, the content providers 18, and/or the personal device 14. In certain embodiments, the media viewing device 12 and/or the set-top box 16 may receive a recommendation to maintain one or more HDR settings if the test results 58 are favorable. Further, in certain embodiments, the media viewing device 12 and/or the set-top box 16 may receive a recommendation for modifications for one or more HDR settings based on unfavorable test results 58. In certain embodiments, the test results 58 may be utilized to automatically or manually change the broadcast settings, such that HDR content is no longer received or provided, in response to unfavorable test results 58. Further still, in certain embodiments, the testing/analysis system 38 may provide a recommendation or notice to one or more manufacturers 60 based on unfavorable test results 58. In particular, such a notification may allow manufacturers 60 to modify HDR settings within the media viewing devices 12 and/or may allow manufacturer 60 to modify the tone mapping features utilized by the media viewing devices 12.

In certain embodiments, one or more functions of the cloud services system 30, the testing/analysis system 38, and/or the test pattern generation system 36 may be performed by the personal device 14. For example, in such embodiments, the personal device 14 may create and store the generated test pattern 40 (or a series of generated test patterns 40) utilized by the verification system 10 to test and evaluate the quality of the HDR content displayed on the media viewing device 12. Further, the media viewing device 12, the set-top box 16, and/or the user 48 may access the stored generated test patterns 40 for display on the media viewing device 12. As noted above, in certain embodiments, the personal device 14 may capture an image of the displayed test pattern for subsequent analysis. In certain embodiments, the personal device 14 may be utilized to view the display 20 and directly measure the chromaticity of each of the one or more steps 45. Furthermore, the personal device 14 may measure one or more differences in hue between the generated and displayed test patterns 40, 44 and provide the test results 58 to one or more of the manufacturer 60, the media playing device 12, the set-top box 16, and/or the content providers 18.

FIG. 2 is a diagrammatical representation of an exemplary generated test pattern 40 provided for display on the media viewing device 12. In the illustrated embodiment, the generated test pattern 40 may include the one or more steps 45 each having a same hue 74, in accordance with aspects of the present embodiments. As noted above, the generated test pattern 40 may be generated by the test pattern generation system 36, and may be provided for display on the media viewing device 12 to test and evaluate the quality of the HDR content displayed on the media viewing device 12. In certain embodiments, the personal device 14 may be configured to create the generated test patterns 40. In particular, the generated test pattern 40 includes the one or more steps 45, a brightness component 70, and a hue component 74. While the illustrated embodiment depicts the generated test pattern 40 with 16 individual steps 45, it should be noted that the generated test pattern 40 may include any number of steps 45 (10, 15, 20, 25, 50, 100, or more). In particular, while the brightness component of the steps 45 may gradually increase along a brightness ramp 72, the hue component 74 is the same for each step 45 of the generated test pattern 40.

In certain embodiments, the brightness component 70 of the generated test pattern 40 may be variable component along the brightness ramp 72. Specifically, the brightness ramp 72 may be a gradual increase in brightness for each of the one or more steps 45. The range of the brightness ramp for each generated test pattern may be between approximately 0 and 15,000 candelas per meters squared ($cd/m^2$), between approximately 0 and 10,000 $cd/m^2$, or between approximately 0 and 5,000 $cd/m^2$, or any range in between. In the illustrated embodiment, the range of the brightness ramp 72 may be between approximately 0 and 10,000 $cd/m^2$, and each step 45 may increase in brightness by approximately 625 $cd/m^2$. It should be noted that in other embodiments, the range of the brightness may increase with other increments and may be dependent on the total range of the brightness ramp 72. In certain embodiments, the range of the brightness ramp 72 may correspond to the transmission standards of the media viewing device 12 and/or the transmission standards of the HDR content. For example, the HDR content provided by the content providers 18 to the media viewing device 14 may be between approximately 0 and 10,000 $cd/m^2$, and the brightness ramp 72 may correspond to this range. In other embodiments, the brightness ramp 72 may correspond to the brightness range capacity of the media viewing device 14, and may follow one or more industry standards for brightness ranges for media devices. The hue component 74 of the generated test pattern 40 may be the same for each step 45. As noted above, a hue may be defined by various degrees (e.g., color ratios) of blue, green, red, and in some cases, yellow. Indeed, each hue may be quantifiable and/or calculated based on its unique composition of red to green to blue. In the illustrated embodiment, the hue component 74 is an unbalanced color pair of a first color 76 and a second color 78. In certain embodiments, the color pair is "unbalanced" because the ratio of the first color 76 to the second color 78 may be large (e.g., 1:10, 1:100, 1:1000, etc.), while a third color 79 is not represented within the hue component 74. For example, in the illustrated embodiment, the hue component 74 for each step 45 may include a bright blue color (e.g., 90%) to a dim red color (e.g., 10%). Further, in the illustrated embodiment, the hue component 74 for each step 45 may not include a green color (e.g., 0%). In other embodiments, other combinations of primary colors (e.g., red, blue, green) may be utilized within the unbalanced pair. As noted above, while the brightness component 70 increases along the brightness ramp 72 for each of the one or more steps 45, the hue component 74 is the same for each of the one or more steps 45.

In certain embodiments, the range of the brightness ramp 72 may exceed the capability of the display 20 for the media viewing device 12. Accordingly, in such embodiments, as noted above, tone mapping techniques may be utilized to adapt the adapt the generated test pattern 40 and approximate the appearance of the generated test pattern 40 for the display 20 of the media viewing device 12. With inferior tone mapping techniques, the processors 22, 32 may reduce the brightness of the second color 78 (e.g., bright blue color) more than the first color 76 (e.g., dim red color) to adapt the generated test pattern 40 for display on the display 20. In some situations, inferior tone mapping techniques may cause the processors 22, 32 to add an additional color component (e.g., the third color 79) to adapt the generated test pattern 40 for display. However, utilizing such inferior tone mapping techniques may cause the hue to shift from the second color 78 (e.g., the bright blue color) to the first color 76 (e.g., dim red color). Or in some situations, utilizing inferior tone mapping techniques may cause the hue to desaturate with the addition of a third color 79. In particular, the color shift may be seen and measured subjectively or objectively, as noted above. Specifically, as further described below in FIG. 3, the color shift may be apparent when measuring the hue of each step 45 to determine deviations from the hue 74 of the generated test pattern 40.

FIG. 3 is a diagrammatical representation of an exemplary displayed test pattern 44 that is displayed on the media viewing device 12. In the illustrated embodiment, the displayed test pattern 44 includes the one or more steps 45 having a hue different from the hue 74 of the generated test pattern 40, in accordance with aspects of the present embodiments. Specifically, as noted above, inferior tone mapping or displaying the generated test pattern 40 on displays without HDR capabilities (e.g., without the capability to display the full brightness range of the generated test pattern 40) may result in various color shifts within one or more steps 45 of the displayed test pattern 44. For example, a first hue 80 of a first step 82 may be different than the hue 74 of the generated test pattern 40. Likewise, a second hue 84 of a second step 86 may be different than the hue 74 of the generated test pattern 40 and different from a third hue 88 of a third step 90.

In certain embodiments, the testing/analysis system 38 may determine the hue of each step 45 of the displayed test pattern 44 by measuring the chromaticity of each step 45 of the displayed test pattern 44. For example, as noted above, each hue may be defined by its composition, and more specifically, each hue may be defined by the color ratios of red, blue, and green within the hue. Accordingly, the testing/analysis system 38 may compare the hue of each step 45 of the displayed test pattern to the hue 74 of the generated test pattern 40. Specifically, in certain embodiments, the testing/analysis system 38 may quantify and measure the composition (e.g., color ratios of red, blue, and green) of the hue of each step 45 of the displayed test pattern 45. Further, the testing/analysis system 38 may compare the color ratios of the hues for the displayed test pattern 45 with the color ratios of the hue 74 utilized to create the generated test pattern 40.

In certain embodiments, the testing/analysis system 38 may evaluate the difference, if any, based on a predetermined threshold and/or a tolerance range. For example, in the illustrated embodiment, the first hue 80 of the first step 82 includes a red component at 19% (versus 10% in the hue 74), a blue component at 80% (versus 90% in the hue 74), and a green component at 1% (versus 0% in the hue 74). The testing/analysis system 38 may be configured to evaluate each of the one or more difference to determine whether the first hue 80 falls within the tolerance range of the hue 74. For example, in certain embodiments, the tolerance range may be 1% above and 1% below the color ratios of the hue 74 of the generated test pattern 80. In other embodiments, the tolerance range may be a different percentage, a tolerance angle, a numeral, or any other metric that may be used to compare hues. Indeed, if the color ratios of the hues of the displayed test pattern 44 fall outside of a predetermined range or tolerance range for any particular step 45, the testing/analysis system 38 may be configured to take (or recommend) corrective actions. In certain embodiments, one or more steps 45 may need to fall outside of the predetermined range of tolerance before the testing/analysis system 38 takes (or recommends) corrective actions.

Figure 4:
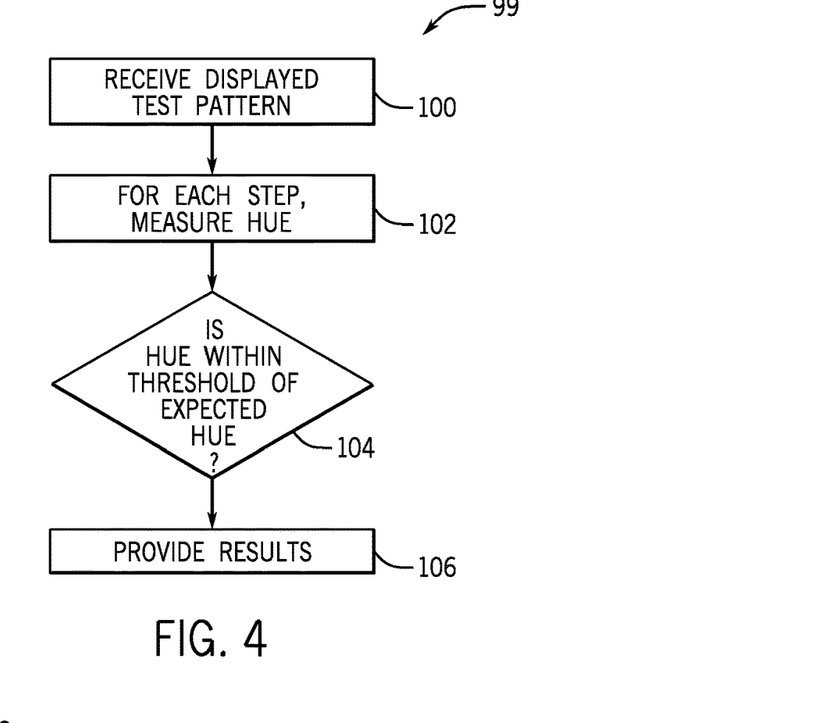
FIG. 4 is a flowchart of a process for evaluating the test pattern displayed on the media viewing device, in accordance with aspects of the present embodiments.

FIG. 4 is a flowchart of a process 99 for evaluating the displayed test pattern 44 displayed on the media viewing device 12, in accordance with aspects of the present embodiments. In should be noted that in certain embodiments, one or more steps of the method 99 may be performed by the personal device 14 to evaluate the displayed test pattern 44 displayed on the media viewing device 12. In the illustrated embodiment, the method 99 begins with the testing/analysis system 38 receiving the displayed test pattern 40 (block 100). As noted above with respect to FIG. 1, the testing/analysis system 38 may receive a captured image of the displayed test pattern 40 from the personal device 14 and/or from the chromaticity sensor 62. Further, it should be noted that while the testing/analysis system 38 may be configured to objectively measure and evaluate the displayed test pattern 40, in some situations, the user 48 may subjectively evaluate the displayed test pattern 40. In certain embodiments, the personal device 14 may utilize one or more communication channels 46 and/or the cloud services system 30 to access the testing/analysis system 38.

The method 99 further includes measuring the hue for each step 45 of the displayed test pattern 40 (block 102). For example, the method 99 may involve measuring the hue for each step 45 of the image received from the displayed test pattern 40. As noted above, the hues may be defined by the color ratios of red, blue, and green that collectively makes up the hue. Accordingly, the hue for each step 45 of the displayed test pattern 40 may be determined by measuring the chromaticity value of the primary color component for each step 45. Further, it should be noted that in certain embodiments, the chromaticity sensor 62 may measure the hue for each step 45 of the displayed test pattern 40 (directly from the display 20), and may provide the measurements to the testing/analysis system 38 for analysis. Further, in certain embodiments, the testing/analysis system 38 may be configured to compare the displayed test pattern 44 against one or more predetermined baseline hues. Accordingly, in such embodiments, the generated testing pattern 40 may not be needed to analyze the chromaticity values for each step 45 of the displayed test pattern 44, but may subjectively compare the hues of the displayed test pattern 44 against one or more baseline hues.

Further, the method 99 includes determining whether the hue is within the tolerance range (e.g., threshold range) of the expected hues (block 104). As noted above, in situations where inferior tone mapping is utilized to adapt the generated test pattern 40 for display on the media viewing device 12, the hues of the displayed test pattern 44 may shift from the hue 74 utilized to create the generated test pattern 40. Indeed, a shift in the hues outside of a predefined threshold or range may be indicative of poor (or nonexistent) tone mapping techniques. In certain embodiments, each chromaticity value of red, blue, and green of the hue (e.g., 80, 84, or 88) of the displayed test pattern 44 may be compared to each chromaticity value of red, blue, and green of the hue 74 of the generated test pattern 40. Further, the testing/analysis system 38 may determine whether the differences between the chromaticity values fall outside of a predetermined range. In other embodiments, the color ratios of each hue for each step 45 of the displayed test pattern 44 may be translated into a single value, which may be utilized for comparisons with the hue 74 of the generated test pattern 40. The method 99 further includes providing the results of the test (block 106) via the one or more communication channels 46 to the manufacturer 60, the content providers 18, the media viewing device 12, the set-top box 16, the personal device 14, and/or the chromaticity sensor 62.

Figure 5:
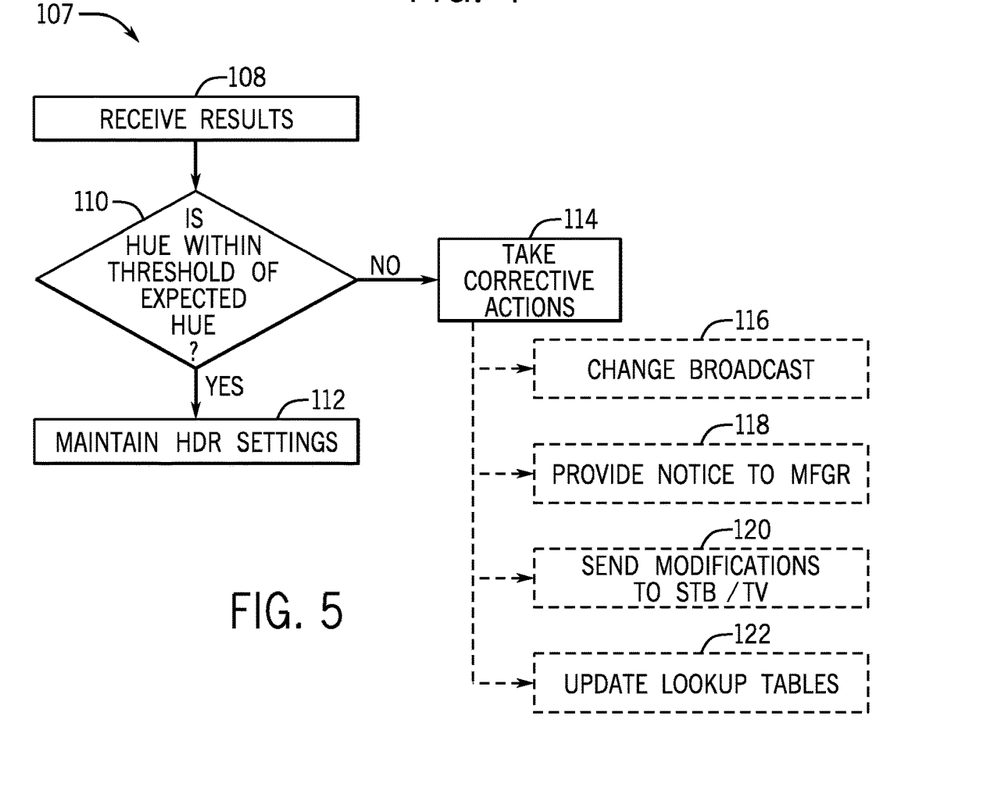
FIG. 5 is a flowchart of a process for taking corrective actions based on the evaluation of the test pattern displayed on the media viewing device, in accordance with aspects of the present embodiments.

FIG. 5 is a flowchart of a process 107 for taking one or more corrective actions based on the evaluation of the displayed test pattern 44 on the media viewing device 12, in accordance with aspects of the present embodiments. Specifically, the method 107 includes receiving the results of the testing process between the generated test pattern 40 and the displayed test pattern 44 (block 108), as noted above. Further, based on the results of the testing process, the testing/analysis system 38 may take corrective actions or may maintain HDR settings of the media viewing device 12. It should be noted that in certain embodiments, one or more steps of the method 107 may be performed by the personal device 14.

In certain embodiments, the method 107 includes determining whether the hues (e.g., 80, 84, 88) of the displayed test pattern 44 fall within the threshold of the expected hue 74 of the generated test pattern 40 (block 110). As noted above, each chromaticity value of red, blue, and green of the hues (e.g., 80, 84, or 88) of the displayed test pattern 44 may be compared to each chromaticity value of red, blue, and green of the hue 74 of the generated test pattern 40. Further, the testing/analysis system 38 may determine whether the differences in the chromaticity values fall outside of a predetermined tolerance range. If the differences in hues between the generated and displayed test patterns 40, 44 are outside of the tolerance range, the testing/analysis system 38 may direct the verification system 10 to take one or more correction actions (block 114). Further, in certain embodiments, if the number of steps 45 having hues that fall outside of the tolerance range is greater than a predetermined threshold number of steps, the testing/analysis system 38 may direct the verification system 10 to take one or more corrective actions (block 114). In certain embodiments, the corrective actions may be taken based on the standards set forth in ST 2029, or based on other standards developed or utilized by the Society of Motion Picture and Television Engineers.

For example, in certain embodiments, the testing/analysis system 38 may utilize the test results 58 to automatically or manually change the broadcast settings of the media viewing device 12 and/or the set-top box 16, such that HDR content is no longer received (block 116). Likewise, in certain embodiments, the testing/analysis system 38 may utilize the test results 58 to automatically or manually change (or provide a notice/recommendation to change) the broadcast settings of the content providers 18. Further, in certain embodiments, the testing/analysis system 38 may provide a recommendation or notice to one or more manufacturers 60 based on unfavorable test results 58 (block 118). In particular, such a notification may allow manufacturers 60 to modify HDR settings within the media viewing devices 12 and/or may allow manufacturer 60 to modify the tone mapping features utilized by the media viewing devices 12. Similarly, in certain embodiments, the testing/analysis system 38 may send modifications (or modification recommendations) to the set-top box 16 and/or the media viewing device 12 (block 120). Indeed, in certain embodiments, the testing/analysis system may provide modifications to update to various tone mapping techniques or processes utilized by the media viewing device 12 and/or the set-top box 16. For example, the modifications may include an update to various lookup tables utilized by the media viewing device 12 and/or the set-top box 16 (block 122), thereby updating the image processing and tone mapping techniques utilized.

The invention claimed is:

1. A processor-implemented method, comprising:
automatically generating, via one or more processors, a test pattern, the generated test pattern comprising a plurality of steps, each step of the plurality of steps comprising a common hue ratio along a brightness ramp of a gradually increasing brightness level;
transmitting, via the one or more processors, the generated test pattern to a media viewing device, and wherein the media viewing device is configured to display the generated test pattern as a displayed test pattern;
receiving, via the one or more processors, displayed test pattern data indicative of resultant hue ratios of one or more steps of the plurality of steps displayed on a display of the media viewing device as the displayed test pattern, wherein at least one resultant hue ratio of the resultant hue ratios differs from the common hue ratio; and
triggering, via the one or more processors, one or more corrective actions based upon the difference between the at least one resultant hue ratio and the common hue ratio.

2. The processor-implemented method of claim 1, wherein the one or more corrective actions comprise:
instructions configured to change a broadcast setting of the display;
instructions configured to provide a recommendation to one or more manufactures of the media viewing device;
instructions configured to send modifications to the media viewing device;
instructions configured to update image processing techniques utilized by the media viewing device;
instructions configured to update tone mapping techniques utilized by the media viewing device; or
any combination thereof.

3. The processor-implemented method of claim 1, further comprising comparing the resultant hue ratios of the one or more steps of the plurality of steps displayed by the media viewing device with the common hue ratio of the one or more steps of the plurality of steps of the generated test pattern, wherein the one or more steps of the plurality of steps is triggered based on the comparison of the resultant hue ratios with the common hue ratio.

4. The processor-implemented method of claim 3, wherein comparing the resultant hue ratios with the common hue ratio comprises determining if the resultant hue ratios are within a threshold range of the common hue ratio.

5. The processor-implemented method of claim 1, further comprising receiving an image of the displayed test pattern displayed on the display, wherein the received image corresponds to the displayed test pattern data.

6. The processor-implemented method of claim 5, further comprising capturing the image of the displayed test pattern with a personal device, wherein the personal device comprises a smart phone, a tablet, a handheld computing device, a camera, a computer, a computing device, or a combination thereof.

7. The processor-implemented method of claim 1, wherein the media viewing device comprises a television set, a hand-held computer, a laptop, a smart phone, or a combination thereof.

8. The processor-implemented method of claim 1, wherein the media viewing device is an High Dynamic Range (HDR) television set configured to support HDR imagery, and wherein digital content is HDR content.

9. The processor-implemented method of claim 1, wherein the common hue ratio and the resultant hue ratio each comprise a ratio of primary colors.

10. A system, comprising:
a processor-based device communicatively coupled with a processor-based media viewing device, wherein the processor-based media viewing device is configured to receive digital content and display the digital content on a display of the media viewing device, and wherein the processor-based device is configured to:
automatically generate a test pattern, wherein the generated test pattern comprises a plurality of steps, wherein each step of the plurality of steps comprises a common hue ratio along a brightness ramp of a gradually increasing brightness level;
transmit the generated test pattern to the media viewing device that displays the generated test pattern as a displayed test pattern;
receive displayed test pattern data indicative of resultant hue ratios of one or more steps of the plurality of steps corresponding to the digital content displayed on the display of the media viewing device as the displayed test pattern, wherein at least one resultant hue ratio of the resultant hue ratios differs from the common hue ratio; and
trigger one or more corrective actions based upon the difference between the at least one resultant hue ratio and the common hue ratio.

11. The system of claim 10, comprising one or more content providers configured to provide the digital content, wherein the digital content comprises High Dynamic Range (HDR) content.

12. The system of claim 11, wherein the processor-based device is configured to determine one or more differences between the generated test pattern and the displayed test pattern to determine a quality of the digital content based on the one or more differences.

13. The system of claim 11, wherein the resultant hue ratios of at least one of the one or more steps of the plurality of steps displayed on the display of the media viewing device comprises a large color ratio of a first primary color to a second primary color.

14. The system of claim 10, wherein the processor-based device is a personal device, and wherein the personal device comprises a smart phone, a tablet, a handheld computing device, a camera, a computer, a computing device, or a combination thereof.

15. The system of claim 10, wherein the processor-based device is a cloud services system.

16. The system of claim 10, comprising a chromaticity sensor configured to measure one or more chromatic values from the displayed test pattern displayed on the media viewing device.

17. A tangible, non-transitory, computer-readable medium configured to store instructions executable by a processor of a personal computing device, wherein the instructions, when executed, are configured to:
automatically generate a test pattern, wherein the generated test pattern comprises a plurality of steps and each step of the plurality of steps comprises a common hue ratio along a brightness ramp of a gradually increasing brightness level;
transmit the generated test pattern to a media viewing device that displays the generated test pattern as a displayed test pattern;
receive displayed test pattern data indicative of resultant hue ratios of one or more steps of the plurality of steps corresponding to digital content displayed on a display of the media viewing device as the displayed test pattern, wherein at least one resultant hue ratio of the resultant hue ratios differs from the common hue ratio; and
trigger one or more corrective actions based upon the difference between the at least one resultant hue ratio and the common hue ratio.

18. The tangible, non-transitory, computer-readable medium of claim 17, wherein the one or more corrective actions comprise:
instructions configured to change a broadcast setting of the display;
instructions configured to provide a recommendation to one or more manufactures of the media viewing device;
instructions configured to send modifications to the media viewing device;
instructions configured to update image processing techniques utilized by the media viewing device;
instructions configured to update tone mapping techniques utilized by the media viewing device; or
any combination thereof.

19. The tangible, non-transitory, computer-readable medium of claim 17, comprising automatically or manually changing a setting of the media viewing device based on one or more differences between the generated test pattern and the displayed test pattern.

* * * * *